Patented Apr. 15, 1924.

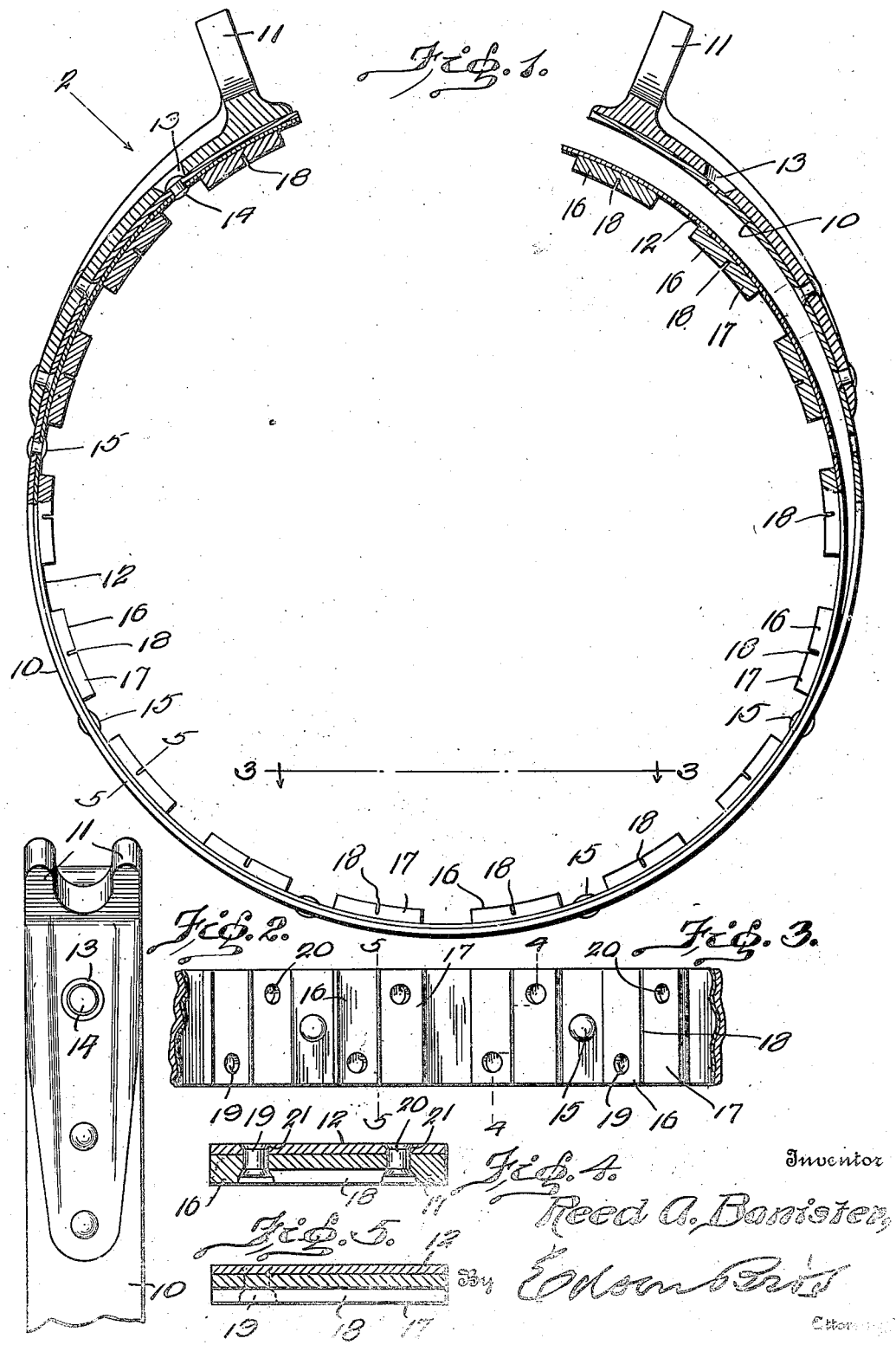

1,490,500

UNITED STATES PATENT OFFICE.

REED ALLEN BANISTER, OF OPELIKA, ALABAMA.

TRANSMISSION-BAND LINING.

Application filed April 3, 1922. Serial No. 549,341.

*To all whom it may concern:*

Be it known that REED ALLEN BANISTER, a citizen of the United States, residing at Opelika, in the county of Lee and State of Alabama, has invented certain new and useful Improvements in Transmission-Band Linings, of which the following is a specification.

This invention relates to linings for brake bands, transmission bands, and the like and has for an object to provide a replaceable and interchangeable band presenting improved features of reliability and length of wear.

A further object of the invention is to provide in combination with a brake or transmission band of the usual and ordinary spring type an additional lining band carrying thereon blocks or segments of friction and wear-resisting material to engage the disc against which it operates, which said liner, together with the wear segments, may be removed from the original spring band quickly and conveniently and replaced when wear makes it necessary.

A further object of the invention is to provide in combination with a spring band for brake, transmission, or like purposes, a liner preferably of thin and practically springless metal riveted to the spring band, having riveted to said liner a plurality of spaced blocks or segments upon the wear surface of the band, which said blocks or segments, together with the liner, may be removed and a new liner applied as occasion may make necessary.

With these and other objects in view, the invention comprises certain novel parts, units, elements, constructions, and combinations, as disclosed in the drawing, together with the mechanical equivalents thereof, as will be hereinafter more fully disclosed and claimed.

In the drawings:

Figure 1 is a view of a conventional or common brake or transmission band seen partly in side elevation and partly in section with the liner and wear lugs applied thereto, said liner and lugs being seen also partly in side elevation and partly in section.

Fig. 2 is a detail elevation of the end of the band in the position indicated by arrow 2 at Fig. 1, showing the means of applying the liner to the brake band.

Fig. 3 is a plan view of the wear surface of the liner and blocks as indicated by arrow 3 at Fig. 1, showing the means of attaching the blocks to the liner and the liner to the band.

Fig. 4 is a transverse sectional view through the liner and one of the blocks indicated by the line 4—4 of Fig. 3.

Fig. 5 is a transverse sectional view through the liner of one of the blocks on the line indicated by 5—5 at Figs. 1 and 3.

Like characters of reference indicate corresponding parts throughout the several views.

The present invention is intended and adapted for use and operation in conjunction with brake and transmission bands of various types, and the showing of such a band in the drawing is intended as no limitation upon the band to which the present invention may apply. Also, as shown in the drawing, the liner is applied to the interior of the band, but it is to be understood that it will be applicable to the exterior band, wherein the wear surface is required upon the exterior. The specific type of band shown in the drawing without limiting the invention, comprises the spring band 10, forming when closed a complete circle, and provided at its expanded spaced extremities with ears or lugs 11 by which power is applied to contract the band to clamp the liner upon the disc to be retarded. There is no novelty in the brake band as disclosed, nor is the invention limited thereto. For a band having the wear surface upon the interior, the liner band 12 is applied to the interior of the spring band 10 and riveted at such points as may be found necessary or desirable. As shown in the drawing, the connecting lugs 11 are drilled at 13 to permit the insertion of a rivet 14 through the lug and its head into engagement with the interior of the spring band 10 and its inner head in engagement with the interior of the liner 12. At other points throughout the circumference of the spring band 10 other rivets 15 are applied, inserted through the spring band 10 and liner 12.

Properly spaced along the wear surface of the liner 12 are a plurality of wear blocks or segments. These wear blocks or segments may be composed of any usual and ordinary wear-resisting material or any wear resisting material which may hereafter become approved, as for instance, fibre blocks, although it is to be understood that the invention is in no way limited to the material of which these blocks are composed. The blocks comprise ribs 16 and 17 united into unitary structure but with a dividing groove or furrow 18 which permits a certain amount of flexibility of the blocks even where they are composed of rigid material such as the fibre blocks referred to, and permit the blocks to conform to the initial or acquired curvature of the band in action. These blocks are rigidly secured to the liner 12 by means of rivets 19 and 20. The rivets 19 and 20 have their heads respectively countersunk in the ribs 16 and 17 so that a considerable portion of the blocks extend toward the wear contact beyond the upset heads of the rivets providing for a considerable amount of wear upon the blocks before the wear is applied to the heads or rivets. Also, the liner 12 is countersunk at 21 by indenting the said band so that it presents upon the surface adjacent upon the spring band 10 a substantially cylindrical surface.

It will be noted especially from Figs. 1 and 3 that the said blocks are spaced apart along the liner 12, presenting recesses between the blocks as well as the recesses providing furrows 18, which will serve to gather and collect grit or other abraiding extraneous matter and not let such abraiding material in contact with the disc against which the blocks engage.

It will be apparent that when the blocks have worn to such an extent as to make them inoperative or inefficient, the entire liner, including the band 12 and the blocks carried thereby, may be quickly removed by punching out the rivets 14 and 15, applying a new liner with blocks attached to the spring band and riveting to position. As the punching out of a few rivets and the replacing of a few other rivets is a matter of a few minutes' work, it will be apparent that the removal and replacement of a liner structure in accordance with this invention will be quickly and easily accomplished.

The operation of the liner thus constructed is, of course, exactly the same as the liners ordinarily employed, and as stated above and now stressed, this liner or its equivalent, falling within the terms of this invention, may be applied either to the interior or the exterior of the spring band. It is obvious, of course, that while spring bands are the usual and ordinary means of accomplishing the purpose, the present invention could be applied as well to any other type of member which closes upon and retards the movement of any disc or similar rotating or moving part.

I claim:

1. A liner for transmission bands, brake bands, comprising a strip of material riveted to the band, and a plurality of spaced wear blocks rigidly secured thereto, each block comprising a plurality of sections flexibly associated with each other.

2. A liner for brake bands, transmission bands, comprising a strip of relatively springless material rigidly secured to the surface of the band, and a plurality of wear blocks rigidly secured to and spaced along the surface of the strip, each block comprising a plurality of sections flexibly associated with each other.

3. A liner for brake bands, transmission bands, comprising a strip of relatively springless material, a plurality of blocks spaced along and rigidly secured to one side of the strip, each block comprising a plurality of sections flexibly associated with each other, and means to secure the strip with its side opposite the blocks rigidly adjacent to the supporting structure.

4. A liner for brake bands, transmission bands, comprising a strip of relatively springless material with rivet holes spaced along its length, a plurality of blocks rigidly secured to one side of the strip in spaced relation, each of said blocks having a groove extending transversely thereof and dividing it into sections flexibly associated with each other.

5. A liner for brake bands, comprising a strip of relatively springless material, a plurality of wear blocks rigidly secured along one surface of the strip in spaced relation, each of said blocks being grooved transversely of its length and dividing it into sections flexibly associated with each other, and means intermediate said spaced blocks for securing the strip to a supporting band.

In testimony whereof he affixes his signature.

REED ALLEN BANISTER.